United States Patent
Saha et al.

(10) Patent No.: US 10,404,188 B2
(45) Date of Patent: Sep. 3, 2019

(54) POWER CONVERSION DEVICES

(71) Applicant: AISIN AW CO., LTD., Anjo-shi, Aichi-ken (JP)

(72) Inventors: Subrata Saha, Anjo (JP); Arinori Shimada, Nishio (JP); Yutaka Hotta, Chiryu (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/763,325

(22) PCT Filed: Nov. 7, 2016

(86) PCT No.: PCT/JP2016/082987
§ 371 (c)(1),
(2) Date: Mar. 26, 2018

(87) PCT Pub. No.: WO2017/086201
PCT Pub. Date: May 26, 2017

(65) Prior Publication Data
US 2018/0287510 A1 Oct. 4, 2018

(30) Foreign Application Priority Data
Nov. 16, 2015 (JP) .................................. 2015-224240

(51) Int. Cl.
*H02M 7/5387* (2007.01)
*H02P 21/22* (2016.01)
*H02P 27/08* (2006.01)

(52) U.S. Cl.
CPC ..... *H02M 7/53871* (2013.01); *H02M 7/5387* (2013.01); *H02M 7/53875* (2013.01); *H02P 21/22* (2016.02); *H02P 27/085* (2013.01)

(58) Field of Classification Search
CPC ...... H02P 1/00; H02P 1/04; H02P 6/00; H02P 6/14; H02P 21/00; H02P 27/04;
(Continued)

(56) References Cited

U.S. PATENT DOCUMENTS 8,884,560 B2 * 11/2014 Ito .................... H02M 5/297
318/400.26
8,885,368 B2 * 11/2014 Kazama ............ H03K 17/164
363/132
(Continued)

FOREIGN PATENT DOCUMENTS

JP    H04-354156 A    12/1992
JP    2002-165439 A    6/2002
(Continued)

OTHER PUBLICATIONS

Jan. 17, 2017 International Search Report issued in Patent Application No. PCT/JP2016/082987.

*Primary Examiner* — Antony M Paul
(74) *Attorney, Agent, or Firm* — Oliff PLC

(57) ABSTRACT

A power conversion device that includes an inverter circuit in which arms are connected in parallel to each other between a DC positive terminal and a DC negative terminal in accordance with a number of phases of alternating currents of the plurality of phases, the arms for respective phases each including two switch sections that are connected in series and to be brought into conduction in an on state and out of conduction in an off state, and a connection point between the two switch sections of each of the arms is set as an AC input or output point of each phase; and a controller that outputs switching control signals for performing switching control on the switch sections.

16 Claims, 5 Drawing Sheets

(58) Field of Classification Search
CPC .. H02P 27/06; H02P 7/00; H02P 23/00; H02P 27/00; H02P 27/08; H02P 27/085; H02P 3/18; H02P 1/46; H02K 23/00; H02K 37/00
USPC ............ 318/400.01, 400.02, 400.14, 400.15, 318/400.26, 400.27, 700, 701, 727, 504, 318/800, 801, 799; 363/40, 44, 95, 120, 363/174, 175
See application file for complete search history.

(56) References Cited

U.S. PATENT DOCUMENTS

2011/0013438 A1    1/2011  Frisch et al.
2011/0241587 A1*  10/2011  Naruse .............. H02M 7/53873
                                              318/400.27

FOREIGN PATENT DOCUMENTS

JP        2008-079475 A    4/2008
JP        2012-253202 A   12/2012

* cited by examiner

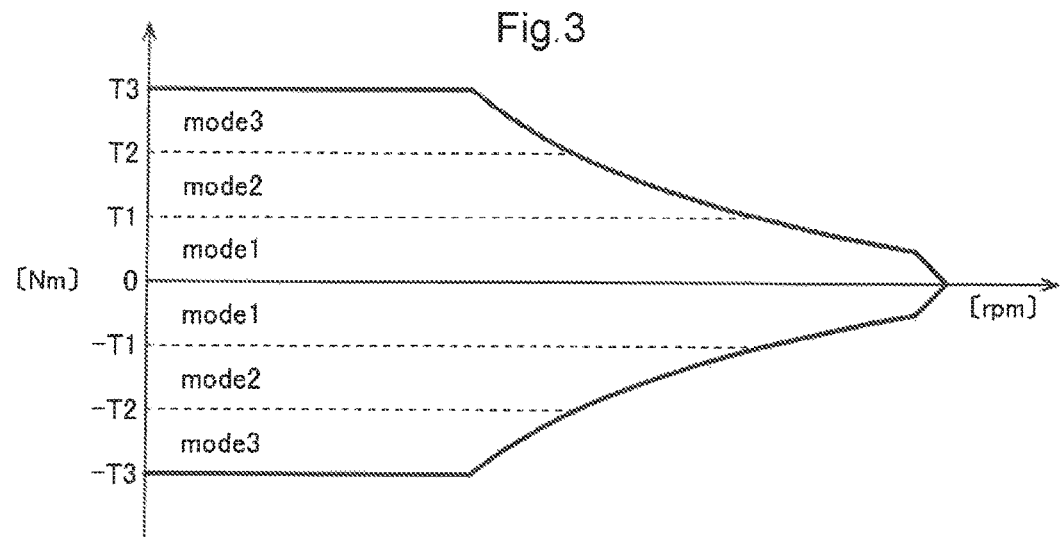
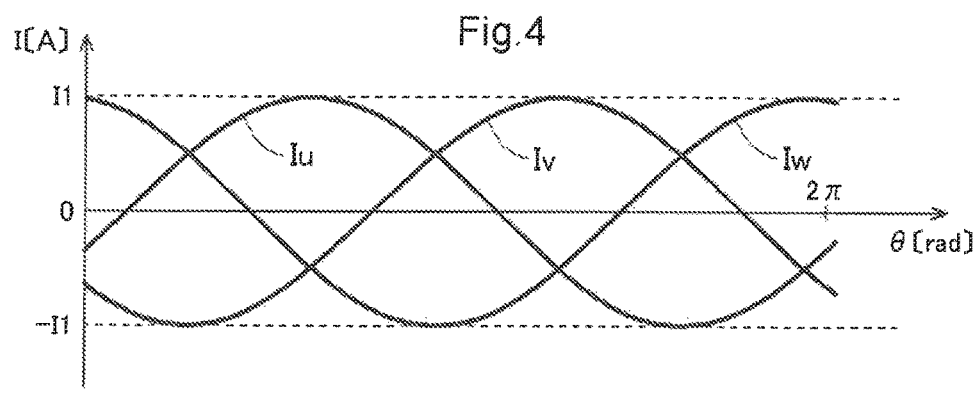
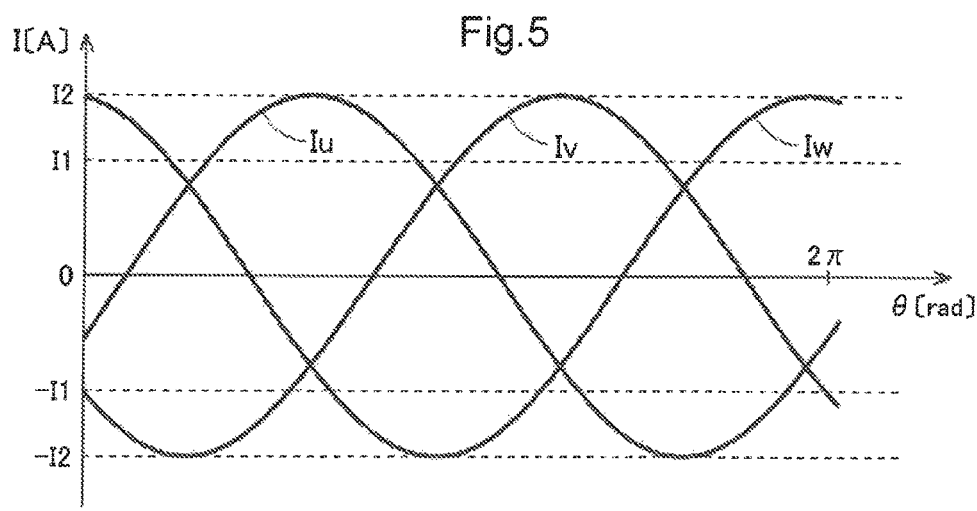

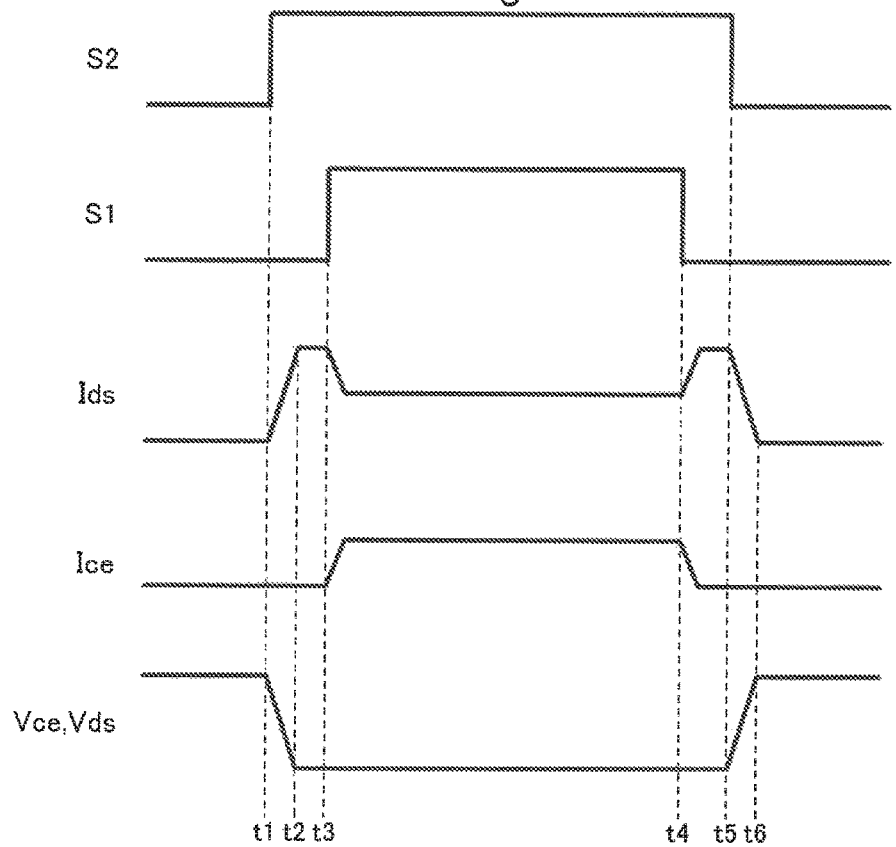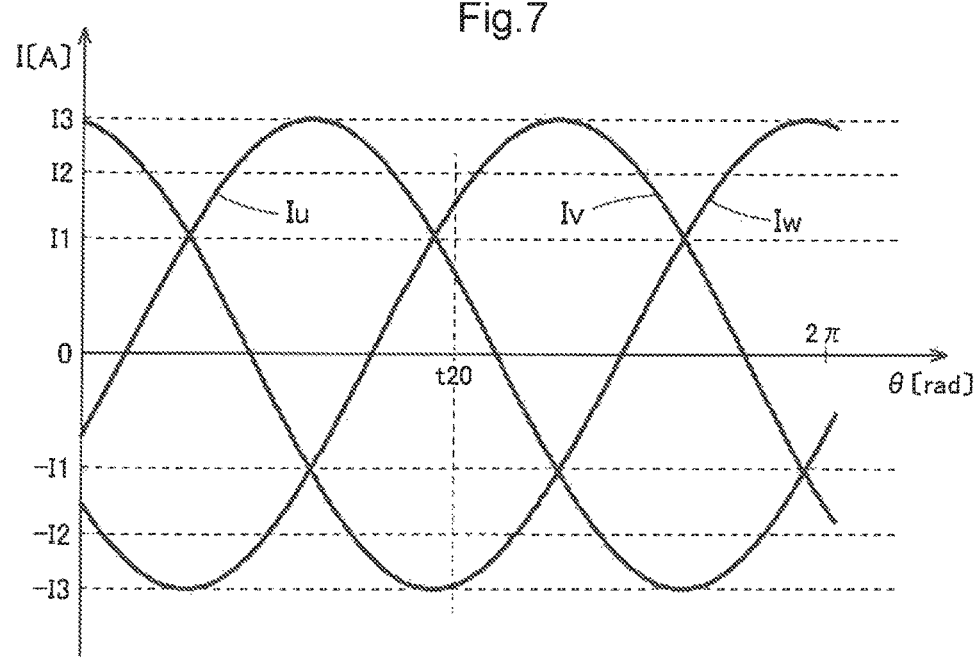

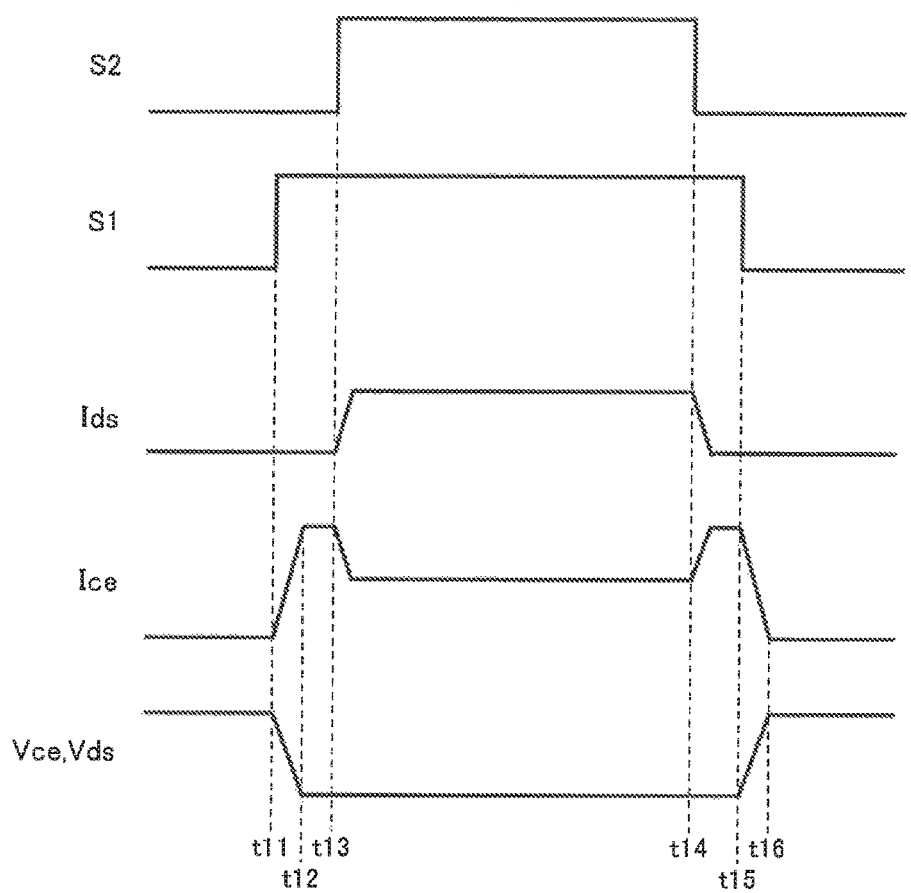

POWER CONVERSION DEVICES

BACKGROUND

The present disclosure relates to a power conversion device that converts electric power between DC power and AC power of a plurality of phases.

Metal oxide semiconductor field effect transistors (MOSFETs), insulated gate bipolar transistors (IGBTs), and the like are known as switching elements to be used for power circuits such as an inverter. The MOSFET and the IGBT have different electric characteristics because of differences in terms of physical properties and structures. In general, the power circuit such as an inverter is structured by switching elements of the same type. Attempts have been made to achieve an electrically wide application range by structuring a circuit in which a plurality of types of switching element are mixed with use of the differences in terms of the electric characteristics of the switching elements. Japanese Patent Application Publication No. 2012-253202 from a source described below discloses a power module (switching elements) in which the MOSFET and the IGBT are connected in parallel in the same package.

FIG. 1 and FIG. 4 of Japanese Patent Application Publication No. 2012-253202 exemplify conceptual diagrams in which control lines are individually provided for a control terminal of the MOSFET and a control terminal of the IGBT. A specific control method is described with reference to FIG. 2. Specifically, the same control signal having two-stage positive voltage levels is supplied to the control terminals of both of the elements, thereby performing control for a case where only the MOSFET is operated and a case where the MOSFET and the IGBT are operated. The technology disclosed in Japanese Patent Application Publication No. 2012-253202 is excellent in that the switching elements having different electric characteristics can selectively be used in accordance with conditions. In the example specifically demonstrated in Japanese Patent Application Publication No. 2012-253202, however, the same control signal is used for control even though the switching elements having different electric characteristics are switched individually. Therefore, it is difficult to more finely control the switching timings of both of the switching elements. There is room for a further increase in efficiency in consideration of an entire system including various circuit components provided together with an inverter circuit and a target to which AC power is supplied by the inverter circuit.

SUMMARY

In view of the background described above, there is a demand to further increase the efficiency of an entire system by using a power conversion device structured by combining a plurality of types of switching element having different electric characteristics.

As one aspect, a power conversion device provided in view of the above converts electric power between DC power and AC power of a plurality of phases. The power conversion device includes: an inverter circuit in which arms are connected in parallel to each other between a DC positive terminal and a DC negative terminal in accordance with the number of phases of alternating currents of the plurality of phases, the arms for respective phases each including two switch sections that are connected in series and to be brought into conduction in an on state and out of conduction in an off state, and a connection point between the two switch sections of each of the arms is set as an AC input or output point of each phase; and a controller that outputs switching control signals for performing switching control on the switch sections.

Each of the switch sections is a parallel circuit of a first switching element and a second switching element that is shorter in a transition time between the off state and the on state than the first switching element. In each of the switch sections, a first control signal line connecting a control terminal of the first switching element to the controller and a second control signal line connecting a control terminal of the second switching element to the controller are provided independently of each other.

The controller independently outputs a first switching control signal to be output to the first control signal line, and a second switching control signal that is a signal different from the first switching control signal and to be output to the second control signal line. The first switching control signal and the second switching control signal are signals for switching, when the first switching element and the second switching element are turned on from the off state to the on state, the first switching element and the second switching element so that a timing when the first switching element is turned on is different from a timing when the second switching element is turned on.

According to this configuration, switching control can individually be performed on the first switching element and the second switching element that have different electric characteristics. That is, the controller can finely control the switching timings of both of the switching elements in accordance with the electric characteristics of the elements. For example, the timings of generation of surges in the switching elements at the time of turn-on operation are distributed. This allows reducing the occurrence of a case where the surges of both of the switching elements are superimposed into a higher surge. Further, a voltage across input and output terminals (for example, across a drain and a source or across a collector and an emitter) can be reduced when one of the switching elements to be brought into the on state with a delay is turned on. Therefore, it is possible to reduce the magnitude of a transient current or a surge to be generated when the switching element is turned on. Thus, it is possible to improve the efficiency of the entire system including various circuit components provided together with the inverter circuit and a target to which AC power is supplied by the inverter circuit. That is, it is possible to further increase the efficiency of the entire system by using the power conversion device structured by combining the plurality of types of switching element having different electric characteristics.

Further features and advantages of the power conversion device will become apparent from the following description of embodiments with reference to the drawings.

BRIEF DESCRIPTION OF THE DRAWINGS

FIG. 3 is a diagram schematically illustrating operating ranges of a rotating electrical machine in accordance with a torque and a rotation speed.

FIG. 4 is a waveform diagram of three-phase AC waveforms each having a maximum amplitude within a small-current range.

FIG. 5 is a waveform diagram of three-phase AC waveforms each having a maximum amplitude within a range up to a first large-current range.

FIG. 6 is a timing chart illustrating an example of switching timings of two switching elements in a pattern B.

FIG. 7 is a waveform diagram of three-phase AC waveforms each having a maximum amplitude within a range up to a second large-current range.

FIG. 8 is a timing chart illustrating an example of switching timings of the two switching elements in a pattern C.

DETAILED DESCRIPTION OF EMBODIMENTS

Figure 1:
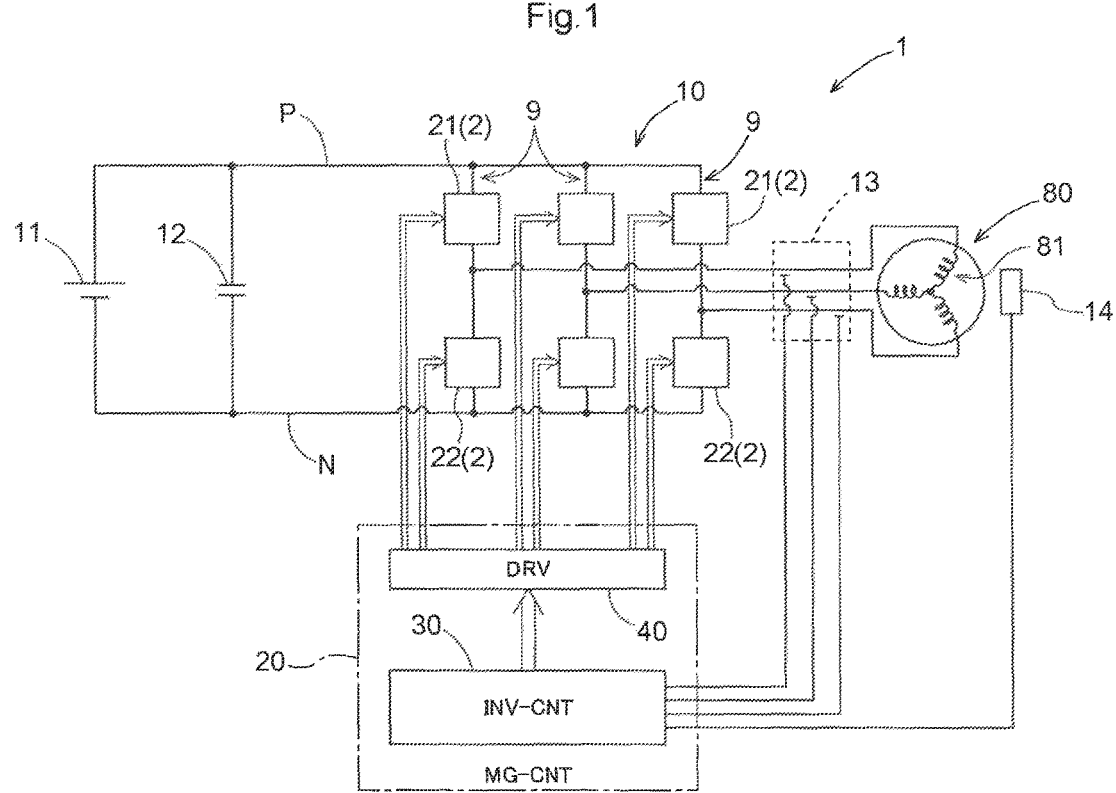
FIG. 1 is a block diagram schematically illustrating the system configuration of a power conversion device.

An embodiment of a power conversion device is described below with reference to the drawings. A block diagram of FIG. 1 schematically illustrates the system configuration of a power conversion device 1. The power conversion device 1 is provided between a DC power supply 11 and an AC rotating electrical machine 80, and converts electric power between a direct current and an alternating current. In this embodiment, the rotating electrical machine 80 is a rotating electrical machine serving as a source of a driving force for a vehicle such as a hybrid vehicle or an electric vehicle. The rotating electrical machine 80 is a rotating electrical machine to be operated by alternating currents of a plurality of phases (alternating currents of three phases in this case), and may function as both of an electric motor and a generator. The rotating electrical machine 80 converts electric power from the DC power supply 11 into a driving force via an inverter 10 (inverter circuit) (power running). Alternatively, the rotating electrical machine 80 converts a rotational driving force transferred from, for example, an unillustrated internal combustion engine or wheel into electric power to charge the DC power supply 11 via the inverter 10 (regeneration).

In this embodiment, the DC power supply 11 is a high-voltage DC power supply having a rated voltage of, for example, about 50 to 400 [V]. For example, the DC power supply 11 is a secondary battery of nickel hydrogen or lithium ion, a capacitor such as an electric double layer capacitor, or a combination of the secondary battery and the capacitor. The DC power supply 11 is a high-voltage and large-capacity rechargeable DC power supply. When the power conversion device 1 includes a DC converter (DC-DC converter) that boosts an output voltage of the DC power supply 11, this converter may be included in the DC power supply. This converter functions as a buck converter when electric power is regenerated in the DC power supply 11 via the inverter 10.

A voltage on a DC side of the inverter 10 (a voltage across a positive terminal P and a negative terminal N on a DC side of the inverter 10, a voltage across terminals of the DC power supply 11, or an output voltage of the converter) is hereinafter referred to as a DC link voltage (Vdc). A smoothing capacitor 12 (DC link capacitor) that smooths the DC link voltage is provided on the DC side of the inverter 10. The smoothing capacitor 12 stabilizes the DC voltage (DC link voltage) that varies in response to variation of power consumption of the rotating electrical machine 80.

As described above, the inverter 10 converts DC power having the DC link voltage into AC power of a plurality of phases (n phases, provided that n represents a natural number; three phases in this case), and supplies the AC power to the rotating electrical machine 80. Further, the inverter 10 converts AC power of a plurality of phases, which is generated by the rotating electrical machine 80, into DC power, and supplies the DC power to the DC power supply. The inverter 10 includes a plurality of switch sections 2. The switch section 2 includes switching elements 3 and freewheeling diodes 4 as described later with reference to FIG. 2 and the like. As the switching element 3, there is used a power semiconductor element such as an insulated gate bipolar transistor (IGBT) or a metal oxide semiconductor field effect transistor (MOSFET) using silicon (Si) as a substrate, a silicon carbide-metal oxide semiconductor FET (SiC-MOSFET), a SiC-static induction transistor (SiC-SIT), or a SiC-IGBT using silicon carbide (SiC) as p substrate, or a gallium nitride-MOSFET (GaN-MOSFET) using gallium nitride (GaN) as a substrate.

Hitherto, the Si-IGBT using silicon (Si) as a substrate is widely used as the switching element 3 of the inverter 10. In recent years, semiconductor materials such as silicon carbide (SiC) and gallium nitride (GaN) have also been put into practical use as a substrate of the power MOSFET or IGBT. The semiconductor materials such as SiC and GaN have a wider band gap (wide band gap semiconductors) than Si, and also have a higher breakdown strength than Si. Thus, those semiconductor materials have a higher basic performance than Si. Because of the high breakdown strength, a high-voltage power element (power switching element) using SiC or GaN as a substrate can achieve a drift layer having a smaller film thickness than that of an element using Si as a substrate. Most resistance components of the high-voltage power element are caused by the thickness of the drift layer. With the high-voltage power element using SiC or GaN as a substrate, it is possible to achieve an element having a significantly lower on resistance per unit area than the element using Si as a substrate.

In the high-voltage power element using Si as a substrate, the IGBT (Si-IGBT) having a structure of a bipolar transistor that is a minority carrier device is mainly used in order to suppress an increase in the on resistance along with an increase in the withstand voltage. The IGBT is a switching element having an FET structure at an input stage and a bipolar transistor structure at an output stage on a single semiconductor element. However, the IGBT has a larger switching loss than, for example, the MOSFET, and has a limitation on switching to be performed at a high frequency due to influence of heat generated as a result of the switching loss. In the high-voltage power element using SiC or GaN as a substrate, the drift layer can be structured thinner as described above. Therefore, this high-voltage power element can suppress the increase in the on resistance along with the increase in the withstand voltage even with the structure of the MOSFET that has a high-speed device structure and is a majority carrier device. That is, the high-voltage power element using SiC or GaN as a substrate can achieve a high withstand voltage, a low on resistance, and a high-frequency operation.

For example, the SiC-MOSFET is capable of performing higher-speed switching than the Si-IGBT. Thus, the SiC-MOSFET can be used at a higher switching frequency. Further, reduction in the loss of the inverter 10 can be expected. However, SiC and GaN are more expensive than Si. Therefore, it is likely that the costs of the inverter 10 and the power conversion device 1 including the inverter 10 increase.

As described above, both of the switching element using Si as a material, such as the Si-IGBT, and the switching element using SiC as a material, such as the SiC-MOSFET, have advantages and disadvantages. Therefore, it is preferable to provide an optimum inverter 10 and an optimum power conversion device 1 including the inverter 10 by taking advantage of the strengths of both switching elements.

Figure 2:
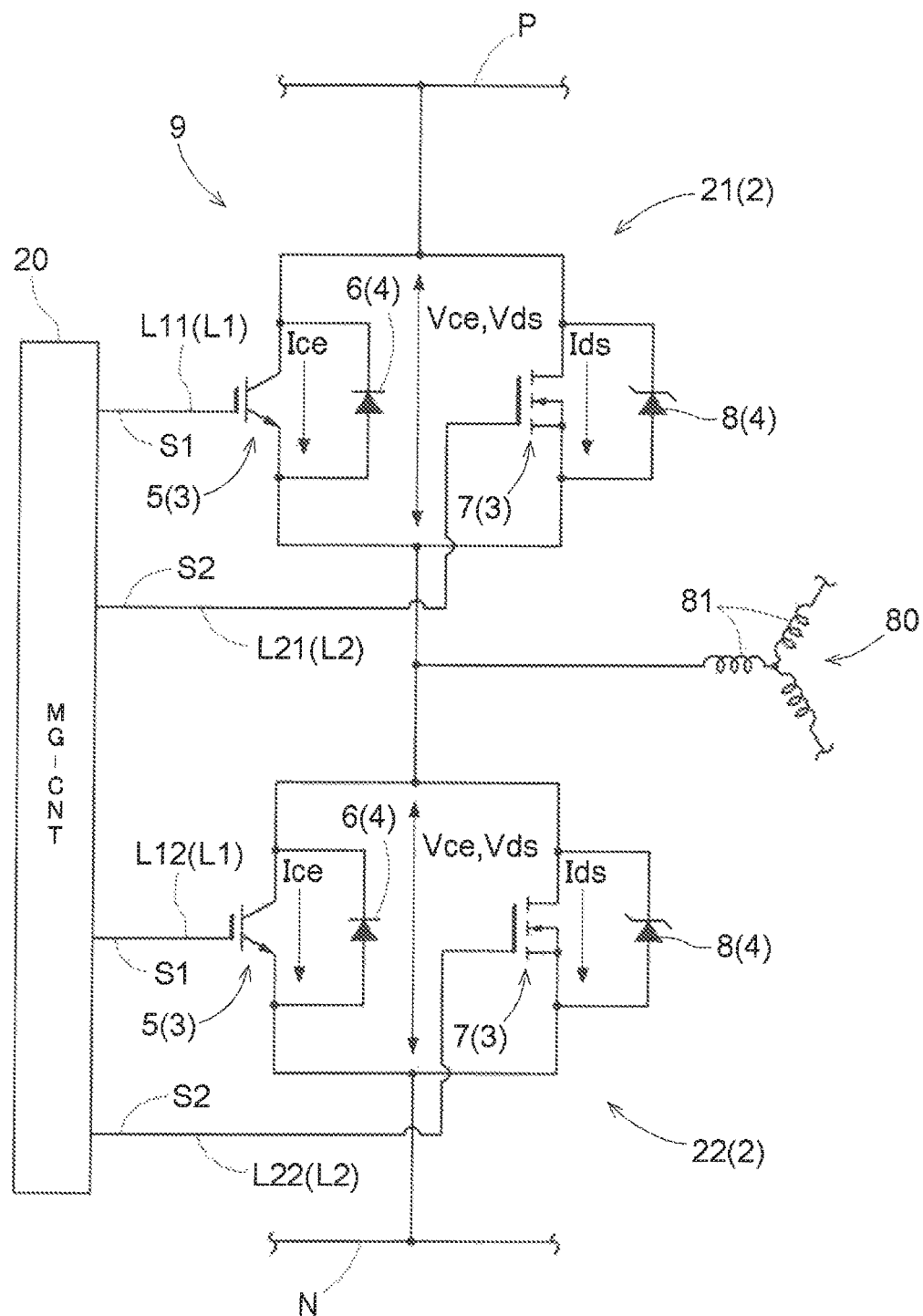
FIG. 2 is a circuit block diagram schematically illustrating the configuration of an arm for one phase.

As illustrated in FIG. 1, the inverter 10 is structured by a bridge circuit including a plurality of sets of arms 9. The inverter 10 includes the arms 9 corresponding to stator coils 81 of respective phases (in the case of three phases, a U phase, a V phase, and a W phase) of the rotating electrical machine 80. The arms 9 each include a pair of upper-stage and lower-stage switch sections 2. Specifically, as illustrated in FIG. 1, the arm 9 for one phase of alternating current is structured by a series circuit including an upper-stage switch section 21 and a lower-stage switch section 22. As illustrated in FIG. 2, each switch section 2 includes the switching elements 3 and the freewheeling diodes 4. The freewheeling diode 4 is connected in parallel to each switching element 3 while a direction from the lower stage to the upper stage is set as a forward direction. In other words, the freewheeling diode 4 is connected in parallel (connected inversely in parallel) to each switching element 3 while a direction opposite to a conduction direction in a case where the switching element 3 is in an on state is set as a forward direction.

As illustrated in FIG. 2, each switching element 3 operates based on a switching control signal (for example, a gate driving signal for driving a gate terminal of the IGBT or MOSFET) S1 or S2 output from a drive control section 20 (MG-CNT). The drive control section 20 is a control device/controller that controls the power conversion device 1 including the inverter 10 so as to control driving of the AC rotating electrical machine 80 via the power conversion device 1. In this embodiment, the drive control section 20 includes an inverter control device 30 (INV-CNT) and a drive circuit 40 (DRV). The inverter control device 30 is implemented by cooperation between hardware such as a logical processor typified by a microcomputer or a digital signal processor (DSP) and software such as a program or parameters. As a matter of course, the inverter control device 30 may be structured by hardware mainly including an electronic circuit such as a logical circuit. The operating voltage of the inverter control device 30 is about 3.3 to 12 [V]. The inverter control device 30 operates by receiving electric power supplied from an unillustrated low-voltage DC power supply (having a rated voltage of, for example, about 12 to 24 [V]).

The gate driving signal to be input to the control terminal (gate terminal) of the power IGBT or MOSFET that switches a high voltage requires a larger voltage amplitude than that of the operating voltage of the electronic circuit (such as a microcomputer) that structures the inverter control device 30. Therefore, the switching control signal (switching control source signal) generated by the inverter control device 30 is input to the inverter 10 after driving power is imparted by the drive circuit 40 through an increase in the voltage amplitude, amplification of the current, or the like. In this embodiment, the inverter control device 30 and the drive circuit 40 are collectively referred to as the drive control section 20. In this embodiment, the control signal (switching control source signal) to be generated and output by the inverter control device 30 and the control signal to be transferred to the switching element 3 via the drive circuit 40 are not distinguished but collectively referred to as the switching control signal unless otherwise noted.

As illustrated in FIG. 1, the rotating electrical machine 80 includes a rotation sensor 14 that detects a magnetic pole position (rotor rotation angle) and a rotation speed of a rotor of the rotating electrical machine 80 at each time point. For example, the rotation sensor 14 is a resolver. A current sensor 13 measures currents flowing through the stator coils 81 of the respective phases of the rotating electrical machine 80. This embodiment exemplifies a configuration in which the non-contact current sensor 13 measures all the three phases. The inverter control device 30 performs current feedback control based on a required torque and a rotation speed of the rotating electrical machine 80 and a modulation rate. For example, the required torque is provided to the inverter control device 30 from an unillustrated other control device such as a vehicle control device or a vehicle traveling control device. The modulation rate is an index indicating a rate of conversion from a DC voltage (DC link voltage) to an AC voltage, and is a value indicating a ratio of an effective value of a line-to-line voltage among AC voltages of a plurality of phases to a DC voltage.

Based on the required torque, the rotation speed, the modulation rate, and the like, the inverter control device 30 generates a pulse (modulation pulse) for performing switching control on the inverter 10, and outputs the pulse as the switching control signal. The modulation pulse may be generated as necessary. Alternatively, there may be employed a mode in which a pulse pattern is stored in a memory or the like in advance based on an operating condition of the rotating electrical machine 80 or the inverter 10 and is output through DMA transfer or the like without a load on the processor.

Modulation may refer to a case of conversion from a direct current to an alternating current, and demodulation may refer to a case of conversion from an alternating current to a direct current. In this manner, both cases may be referred to as distinctive terms. Alternatively, both cases may collectively be referred to as modulation/demodulation. This embodiment is described while both types of conversion are referred to as modulation. In this embodiment, the inverter control device 30 controls the rotating electrical machine 80 via the inverter 10 by performing current feedback control using a vector control method. The vector control method is briefly described as follows, and detailed description is omitted.

First, the inverter control device 30 computes current commands in an orthogonal vector coordinate system of the vector control based on the DC link voltage, the required torque, the modulation rate, and the like. The orthogonal vector coordinate system is a coordinate system in which a direction of magnetic poles of the rotor of the rotating electrical machine 80 is defined as one axis (d-axis) and a direction orthogonal to this axis (d-axis) is defined as the other axis (q-axis). The currents of the three phases (actual currents) that flow through the stator coils 81 are subjected to coordinate conversion in the orthogonal vector coordinate system based on the magnetic pole position. In the orthogonal vector coordinate system, computation of proportional-integral control (PI control) or proportional-integral-derivative control (PID control) is performed based on deviations between the current commands and the actual currents, thereby deriving voltage commands. The voltage commands are subjected to inverse coordinate conversion into voltage commands of the three phases based on the magnetic pole position. Thus, modulation pulses (switching control signals) are generated in accordance with a selected modulation scheme.

As illustrated in, for example, FIG. 3, the operating range of the rotating electrical machine 80 extends over a wide range in accordance with the required torque and the rotation speed. There are various types of modulation scheme for controlling the rotating electrical machine 80. Optimum modulation schemes differ depending on operating points to be defined based on the required torque and the rotation speed. In this embodiment, as illustrated in FIG. 3, three different operating ranges are set in accordance with the torque. Different modulation schemes (operating modes: mode 1, mode 2, mode 3) are employed in the respective operating ranges. Details of the operating modes are described later with reference to FIG. 4 to FIG. 8 and the like.

As the modulation scheme, pulse width modulation is known. In the pulse width modulation, a pulse is generated based on a magnitude relationship between the amplitude of an AC waveform serving as an output command (for example, an AC voltage waveform) and the amplitude of a waveform of a carrier in the form of a triangular wave (including a sawtooth wave). A PWM waveform may directly be generated through digital computation rather than through comparison with the carrier. Also in this case, the amplitude of the AC waveform serving as a command value and the amplitude of an imaginary carrier waveform have a correlation therebetween. Unless otherwise noted, the term "frequency of switching control signal" hereinafter refers to a frequency of the carrier. The pulse width modulation includes sinusoidal pulse width modulation (SPWM), space vector pulse width modulation (SVPWM), and discontinuous pulse width modulation (DPWM).

Prior to the description of each operating mode, the configuration of the inverter 10 of this embodiment is described. As illustrated in FIG. 1, in the inverter 10, the arms 9 are connected in parallel to each other between the DC positive terminal P and the DC negative terminal N in accordance with the number of phases of alternating currents of the plurality of phases, and the arms 9 for the respective phases each include two switch sections 2 that are connected in series and to be brought into conduction in an on state and out of conduction in an off state. The connection point between the two switch sections 2 of each arm 9 is an AC input or output point of each phase. In this embodiment, the connection point between the two switch sections 2 of the arm 9 for a corresponding one of the three phases is connected to a corresponding one of the star-connected stator coils 81 of the three phases of the rotating electrical machine 80.

As illustrated in FIG. 2, in this embodiment, each switch section 2 is structured by a parallel circuit of two switching elements 3. Specifically, each switch section 2 is structured by a parallel circuit of a first switching element 5 and a second switching element 7. This embodiment exemplifies a configuration in which the first switching element 5 is a Si-IGBT and the second switching element 7 is a SiC-MOSFET. As described above, the SiC-MOSFET is a switching element 3 that is shorter in a transition time between the off state and the on state than the Si-IGBT. The first switching element 5 and the second switching element 7 are not limited to this combination. It is only necessary that the second switching element 7 be the switching element 3 that is shorter in the transition time between the off state and the on state than the first switching element 5.

As the freewheeling diodes 4, this embodiment exemplifies a configuration in which a p-n junction diode (preferably a fast recovery diode) is connected in parallel to the first switching element 5 that is the Si-IGBT and a Schottky barrier diode is connected in parallel to the second switching element 7 that is the SiC-MOSFET. The fast recovery diode is a diode that is relatively short in the time in which a forward current continuously flows after the on state in which a forward voltage is applied is switched to the off state (reverse recovery time). The reverse recovery time of a general p-n junction diode is about several tens [μs] to a hundred [μs], whereas the reverse recovery time of the fast recovery diode is about 100 [nsec] or shorter. The Schottky barrier diode is a diode using rectification of Schottky junction (contact between a metal and a semiconductor) instead of p-n junction. In view of the operating principle, the reverse recovery time is not present in the Schottky barrier diode, and a higher-speed operation is possible as compared to the fast recovery diode. In general, a Schottky barrier diode using Si as a substrate has a problem with the withstand voltage. Therefore, it is preferable that the Schottky barrier diode be an element using SiC as a substrate when used as the freewheeling diode.

As the freewheeling diodes 4, the Schottky barrier diode may be provided for the first switching element 5, and the fast recovery diode may be provided for the second switching element 7. The fast recovery diodes may be provided for both of the switching elements (5 and 7), or the Schottky barrier diodes may be provided for both of the switching elements (5 and 7). In this embodiment, the upper-stage switch section 21 and the lower-stage switch section 22 have similar configurations. Thus, unless otherwise noted, the upper-stage switch section 21 and the lower-stage switch section 22 are hereinafter described simply as the switch sections 2 without distinguishing the upper stage and the lower stage.

As illustrated in FIG. 2, in each switch section 2, a first control signal line L1 connecting a control terminal (gate terminal) of the first switching element 5 to the drive control section 20 and a second control signal line L2 connecting a control terminal (gate terminal) of the second switching element 7 to the drive control section 20 are provided independently of each other. Thus, the drive control section 20 can independently control the first switching element 5 and the second switching element 7 by transferring the first switching control signal S1 via the first control signal line L1 and the second switching control signal S2 via the second control signal line L2. The drive control section can independently output the first switching control signal S1 to be output to the first control signal line L1, and the second switching control signal S2 that is a signal different from the first switching control signal S and to be output to the second control signal line L2.

As a matter of course, the control signal lines for the upper-stage switch section 21 and the control signal lines for the lower-stage switch section 22 are also provided independently of each other. Specifically, an upper-stage first control signal line L11 connecting the control terminal of the first switching element 5 of the upper-stage switch section 21 to the drive control section 20, an upper-stage second control signal line L21 connecting the control terminal of the second switching element 7 of the upper-stage switch section 21 to the drive control section 20, a lower-stage first control signal line L12 connecting the control terminal of the first switching element 5 of the lower-stage switch section 22 to the drive control section 20, and a lower-stage second control signal line L22 connecting the control terminal of the second switching element 7 of the lower-stage switch section 22 to the drive control section 20 are provided independently of each other.

As described above with reference to FIG. 3, in this embodiment, the three operating ranges are set in accordance with the torque. Different modulation schemes (operating modes) are employed in the respective operating ranges as follows.

| required torque≤|T1| | First operating mode (mode 1): |
| |T1|≤required torque≤|T2| | Second operating mode (mode 2): |
| |T2|≤required torque<|T3| | Third operating mode (mode 3): |

In this embodiment, in the respective operating modes, the switching elements 3 are subjected to switching control in three different switching patterns based on instantaneous values of the alternating currents of the three phases (Iu, Iv, Iw). Relationships between the respective switching patterns and the instantaneous values of the alternating currents of the three phases (Iu, Iv, Iw) are as follows. Unless otherwise noted, the "instantaneous value" refers to an "absolute value".

| {Iu,Iv,Iw}<|I1| | Pattern A: |
| |I1|≤{Iu,Iv,Iw}<|I2| | Pattern B: |
| |I2|{Iu,Iv,Iw}<|I3| | Pattern C: |

As illustrated in FIG. 4, the condition in which the pattern A is applied is a case of a small-current range in which the instantaneous values of the alternating currents of the three phases (Iu, Iv, Iw) are lower than a small-current reference value (|I1|). In the pattern A, the current flowing through the switch section 2 is small. Therefore, there is no problem even when one switching element 3 out of the two switching elements 3 connected in parallel is fixed to the off state and the current flows only through the other switching element 3 in each switch section 2. In this embodiment, only the second switching element 7 that is relatively short in the time of transition between the off state and the on state (transition time) and is small in a loss occurring in the transition is subjected to switching control, and the first switching element 5 is fixed to the off state.

That is, in the small-current range in which the instantaneous values of the alternating currents of the three phases (Iu, Iv, Iw) are lower than the small-current reference value (|I1|), only the second switching element 7 is subjected to switching control by transferring the second switching control signal S2 via the second control signal line L2. In the small-current range, the first switching element 5 is controlled constantly in the off state by transferring the first switching control signal S1 in an ineffective state via the first control signal line L1. The second switching element 7 that is the SiC-MOSFET is shorter in the time of recovery of an input-to-output terminal voltage (Vds) at the time of turn-off operation (recovery time) and is small in the switching loss than the first switching element 5 that is the Si-IGBT. Owing to the short recovery time, it is possible to reduce a period (dead time) in which both of the upper-stage switch section 21 and the lower-stage switch section 22 of each arm 9 are in the off state. The reduction in the dead time leads to an increase in the switching frequency. When the switching frequency is increased, pulsation of three-phase AC waveforms is reduced, and distortion is also reduced. Thus, pulsation of the DC link voltage is also reduced. Therefore, the capacitance of the smoothing capacitor 12 configured to smooth the DC link voltage can be reduced, whereby downsizing can be achieved.

The condition in which the pattern B and the pattern C are applied is a case of a large-current range in which the instantaneous values of the alternating currents of the three phases (Iu, Iv, Iw) are equal to or higher than the small-current reference value (|I1|). In the large-current range, the current flowing through the switching element 3 is larger than that of the small-current range. Therefore, both of the two switching elements 3 connected in parallel are subjected to modulation control in each switch section 2. That is, in the large-current range in which the instantaneous values of the alternating currents of the three phases (Iu, Iv, Iw) are equal to or higher than the small-current reference value (|I1|), both of the first switching element 5 and the second switching element 7 are subjected to switching control by transferring the first switching control signal S1 via the first control signal line L1 and the second switching control signal S2 via the second control signal line L2. It is preferable that both of the switching elements 3 (5 and 7) be subjected to switching control in each switch section 2 so that the timing when the first switching element 5 transitions between the off state and the on state does not coincide with the timing when the second switching element 7 transitions between the off state and the on state.

FIG. 5 illustrates maximum alternating currents of the three phases (Iu, Iv, Iw) when the pattern A and the pattern B are applied. When the pattern B is applied, the maximum instantaneous value of the alternating current is "|I2|" ("large-current reference value" described later). As illustrated in FIG. 5, when the instantaneous values of the alternating currents of the three phases (Iu, Iv, Iw) are equal to or higher than the small-current reference value (|I1|) during one cycle of an electrical angle θ, switching control is performed in both of the pattern A and the pattern B during one cycle of the electrical angle θ. That is, in a phase angle (θ) in which the alternating current of each phase is close to the amplitude center and its instantaneous value is lower than the small-current reference value (|I1|), switching control is performed in the pattern A. In a phase angle (θ) in which the instantaneous value of the alternating current of each phase is equal to or higher than the small-current reference value (|I1|), switching control is performed in the pattern B.

As described above, in the large-current range, both of the switching elements 3 (5 and 7) are subjected to switching control in each switch section 2 so that the timing when the first switching element 5 transitions between the off state and the on state does not coincide with the timing when the second switching element 7 transitions between the off state and the on state. As one aspect, when the pattern B is applied, the first switching element 5 is caused to transition to the on state after the second switching element 7 is caused to transition to the on state, and the second switching element 7 is caused to transition to the off state after the first switching element 5 is caused to transition to the off state.

Description is given below with reference to a timing chart of FIG. 6. The description is herein given while ignoring the internal resistance of the switching element 3, floating impedance, and the like. In the example illustrated in FIG. 6, the second switching control signal S2 is brought into an effective state at time t1. By transferring the second switching control signal S2 via the second control signal line L2, the second switching element 7 transitions from the off state to the on state (turn-on). After an elapse of a transition time from time t1 to time t2, the terminal-to-terminal voltage of the second switching element 7 (drain-to-source voltage Vds) is substantially zero, and the current flowing through the second switching element 7 (drain-to-source current Ids) increases to a maximum value. The first switching element 5 and the second switching element 7 are connected in parallel, and therefore the terminal-to-terminal voltage of the first switching element 5 (collector-to-emitter voltage Vce) is also substantially zero.

At time t3 subsequent to time t2 when the terminal-to-terminal voltage of the first switching element 5 (Vce) is substantially zero, the first switching control signal S1 is brought into the effective state. By transferring the first switching control signal S1 via the first control signal line L1, the first switching element 5 transitions from the off state to the on state (turn-on). At this time, the terminal-to-terminal voltage of the first switching element 5 (Vce) is substantially zero. Therefore, a transient current hardly flows along with the turn-on operation. Thus, so-called zero voltage switching is achieved. This configuration significantly reduces the occurrence of a loss due to a turn-off operation of the first switching element 5 that is larger in the switching loss than the second switching element 7. As described above, when the pattern B is applied, the drive control section 20 causes the first switching element 5 to transition to the on state after causing the second switching element 7 to transition to the on state.

Also when the first switching element 5 and the second switching element 7 transition from the on state to the off state (turn-off), both of the elements (5 and 7) are subjected to switching control at timings that can achieve the zero voltage switching of the first switching element 5. Specifically, at time t4 prior to time t5 when the second switching element 7 starts the turn-off operation, the first switching control signal S1 is brought into the ineffective state. By transferring the first switching control signal S1 via the first control signal line L1, the first switching element 5 is turned off. After the first switching element 5 transitions to the off state, the second switching control signal S2 is brought into the ineffective state at time t6. By transferring the second switching control signal S2 via the second control signal line L2, the second switching element 7 is turned off. As described above, when the pattern B is applied, the drive control section 20 causes the second switching element 7 to transition to the off state after causing the first switching element 5 to transition to the off state.

FIG. 7 illustrates maximum alternating currents of the three phases (Iu, Iv, and Iw) when all of the pattern A, the pattern B, and the pattern C are applied. As described above, the large-current range includes a range in which the pattern B is applied and a range in which the pattern C is applied. In the large-current range, the range in which the pattern B is applied is referred to as a first large-current range, and the range in which the pattern C is applied is referred to as a second large-current range. The first large-current range is a range in which the instantaneous values of the alternating currents of the three phases are equal to or higher than the small-current reference value (|I1|) and lower than the large-current reference value (|I2|) that is higher than the small-current reference value (|I1|). The second large-current range is a range in which the instantaneous values of the alternating currents of the three phases are equal to or higher than the large-current reference value (|I2|). The symbol "|I3|" represents a maximum current value that is allowable in the switch section 2. When the definition is made including the maximum value, the second large-current range is a range in which the instantaneous values of the alternating currents of the three phases are equal to or higher than the large-current reference value (|I2|) and lower than the maximum-current reference value (|I3|).

As illustrated in FIG. 7, when the instantaneous values of the alternating currents of the three phases (Iu, Iv, Iw) are equal to or higher than the large-current reference value (|I2|) during one cycle of the electrical angle θ, switching control is performed in all of the switching patterns that are the pattern A, the pattern B, and the pattern C during one cycle of the electrical angle θ. That is, in a phase angle (θ) in which the alternating current of each phase is close to the amplitude center and its instantaneous value is lower than the small-current reference value (|I1|), switching control is performed in the pattern A. In a phase angle (θ) in which the instantaneous value of the alternating current of each phase is equal to or higher than the small-current reference value (|I1|) and lower than the large-current reference value (|I2|), switching control is performed in the pattern B. In a phase angle (θ) in which the instantaneous value of the alternating current of each phase is equal to or higher than the large-current reference value (|I2|), switching control is performed in the pattern C.

As described above, in the large-current range, switching control is performed in each switch section 2 so that the timing when the first switching element 5 transitions between the off state and the on state does not coincide with the timing when the second switching element 7 transitions between the off state and the on state. When the pattern B is applied, that is, in the example of the first large-current range, the operation is performed as described above with reference to FIG. 6. Similarly in the second large-current range in which the pattern C is applied, switching control is performed so that the timings when both of the switching elements (5, 7) transition between the off state and the on state do not coincide with each other. As exemplified in FIG. 8, in the pattern C, conversely to the pattern B, the second switching element 7 is caused to transition to the on state after the first switching element 5 is caused to transition to the on state, and the first switching element 5 is caused to transition to the off state after the second switching element 7 is caused to transition to the off state.

In the second large-current range, the instantaneous value of the alternating current is higher than that of the first large-current range. The second switching element 7 is an element that is shorter in the transition time between the off state and the on state than the first switching element 5. When the second switching element 7 is such an element, a surge voltage is higher than that of the first switching element 5. For example, the surge voltage of the SiC-MOSFET is generally higher than that of the Si-IGBT. Thus, when the second switching element 7 is first turned on in the second large-current range in which the instantaneous value of the alternating current is higher than that of the first large-current range, a surge voltage higher than an allowable value may be applied to the switching element 3.

In the first large-current range, the condition in which the second switching element 7 is solely brought into the on state is created, and the first switching element 5 that is relatively large in the switching loss is subjected to zero voltage switching, thereby reducing a loss occurring at time of one turn-on and turn-off operation. In the second large-current range, the condition in which the first switching element 5 is solely brought into the on state is created, and the second switching element 7 that is relatively high in the surge voltage is subjected to zero voltage switching, thereby reducing generation of a transient surge voltage. In the condition in which the second switching element 7 is in the on state, the current is distributed to the two switching elements 3. Therefore, the current flowing through the switching element 3 is reduced even when the instantaneous value increases.

In the example illustrated in FIG. 8, the first switching control signal S1 is brought into the effective state at time t11. By transferring the first switching control signal S1 via the first control signal line L1, the first switching element 5 is turned on. After an elapse of a transition time from time t11 to time t12, the terminal-to-terminal voltage of the first switching element 5 (Vce) is substantially zero, and the current flowing through the first switching element 5 (Ice) is a maximum value. The terminal-to-terminal voltage of the second switching element 7 (Vds) connected in parallel to the first switching element 5 is also substantially zero.

At time t13 subsequent to time t12 when the terminal-to-terminal voltage of the second switching element 7 (Vds) is substantially zero, the second switching control signal S2 is brought into the effective state. By transferring the second switching control signal S2 via the second control signal line L2, the second switching element 7 is turned on. At this time, the terminal-to-terminal voltage of the second switching element 7 (Vds) is substantially zero. Therefore, the transient current hardly flows along with the turn-on operation. Thus, the so-called zero voltage switching is achieved. As described above, when the pattern C is applied, the drive control section 20 causes the second switching element 7 to transition to the on state after causing the first switching element 5 to transition to the on state.

Also when the first switching element 5 and the second switching element 7 are turned off, both of the elements (5, 7) are subjected to switching control at timings that can achieve the zero voltage switching of the second switching element 7. Specifically, at time t14 prior to time t15 when the first switching element 5 starts the turn-off operation, the second switching control signal S2 is brought into the ineffective state. By transferring the second switching control signal S2 via the second control signal line L2, the second switching element 7 is turned off. After the second switching element 7 transitions to the off state, the first switching control signal S1 is brought into the ineffective state at time t16. By transferring the first switching control signal S1 via the first control signal line L1, the first switching element 5 is turned off. As described above, when the pattern C is applied, the drive control section 20 causes the first switching element 5 to transition to the off state after causing the second switching element 7 to transition to the off state.

As described above, particularly when the pattern B and the pattern C are included, the switching pattern differs depending on the phase angle (θ) of the alternating current even in the same phase. Further, the instantaneous value of each of the alternating currents of the three phases (Iu, Iv, Iw) differs depending on the phase angle (θ). The switching patterns of the respective phases are selected based on the instantaneous values of the alternating currents (Iu, Iv, Iw). Therefore, the switching patterns of the three phases differ depending on the phase angle (θ), and the switching control signals (S1 and S2) are generated independently of each other. For example, at time t20 illustrated in FIG. 7, the U phase is controlled in the pattern A, the V phase is controlled in the pattern B, and the W phase is controlled in the pattern C.

The switching control signals (S1, S2) of the three phases are generated independently of each other. Therefore, it is preferable that the switching control signals (S1, S2) have frequencies (switching frequencies) that are independent among the phases. That is, it is preferable that modulations in the pattern A, the pattern B, and the pattern C be performed at different frequencies (carrier frequencies). As the frequencies of the switching control signals (S1, S2) are higher, the waveform of the generated alternating current is closer to a sinusoidal wave, whereby pulsation and distortion of the waveform are reduced. Thus, it is preferable that the frequencies of the switching control signals (S1, S2) be as high as possible. When the frequency increases, the switching loss tends to increase as a matter of course. The switching loss decreases as the current flowing through the switching element (3) is smaller. Thus, it is preferable that the frequency be higher as the instantaneous value of the alternating current is lower. In other words, it is preferable that the frequencies of the switching control signals (S1, S2) of the three phases be higher in the small-current range than the large-current range.

That is, it is preferable that the frequency of the pattern B be higher than the frequency of the pattern C, and that the frequency of the pattern A be higher than the frequency of the pattern B. In the second operating mode, pulses of the pattern A and the pattern B are mixed during one cycle of the electrical angle. That is, the phase angle in which modulation is performed in the pattern A at a high switching frequency and the phase angle in which modulation is performed in the pattern B at a low switching frequency are mixed during one cycle of the electrical angle. Focusing on the line-to-line voltage among the three-phase alternating currents, the phase angles of the respective phases are shifted by $2\pi/3$ [rad], and therefore any one phase is constantly modulated at a high frequency (see FIG. 5). That is, this condition is equivalent to a condition in which the three-phase alternating currents are modulated at a high frequency as a whole. Through the increase in the frequencies of the three-phase alternating currents, pulsation and distortion of the three-phase alternating currents are reduced. Consequently, the loss of the rotating electrical machine 80 to which AC power is supplied by the inverter 10 is reduced, whereby the efficiency is improved. That is, the loss of the entire system is reduced, whereby the efficiency can be improved. In the third operating mode, pulses of the pattern A, the pattern B, and the pattern C are mixed during one cycle of the electrical angle. The increase in the frequencies of the three-phase alternating currents is similar, and therefore detailed description is omitted (see FIG. 7).

As exemplified below, it is preferable that the frequency of the pattern B be higher than the frequency of the pattern C, that the frequency of the pattern A be higher than the frequency of the pattern B, and that those frequencies be variable within the following ranges.

Pattern A: f1 [Hz] to f10 [Hz]

Pattern B: f2 [Hz] to f20 [Hz], provided that f2<f1 and f20<f10 are satisfied

Pattern C: f3 [Hz] to f30 [Hz], provided that f3<f2 and f30<f20 are satisfied

As described above, as the frequencies of the switching control signals (S1, S2) are higher, the waveform of the generated alternating current is closer to a sinusoidal wave, whereby pulsation and distortion of the waveform are reduced. Allowable ranges of pulsation and distortion differ depending on the forms and conditions of use of the power conversion device 1.

As one aspect, it is preferable that the frequencies of the switching control signals (S1, S2) be set in accordance with the speed and the torque of the rotating electrical machine 80 to be driven via the power conversion device 1, the modulation rate between the direct current and the alternating current, and the like. That is, it is preferable that the frequencies of the switching control signals be set in accordance with at least one of the speed of the rotating electrical machine 80, the torque (required torque) of the rotating electrical machine 80, and the modulation rate from the direct current to the alternating current.

For example, it is preferable that the frequencies of the switching control signals (S1, S2) be set so as to decrease as the torque (required torque) of the rotating electrical machine 80 increases. Further, it is preferable that the frequencies of the switching control signals (S1, S2) be set so as to increase as the speed of the rotating electrical machine 80 increases. Further, it is preferable that the frequencies of the switching control signals (S1, S2) be set so as to decrease as the modulation rate increases. When the frequencies are set based on two or more of the torque of the rotating electrical machine 80, the rotation speed of the rotating electrical machine, and the modulation rate, it is preferable to provide a map or the like that defines relationships between those parameters and the frequencies.

In the above, description is given of the exemplary configuration in which the rotating electrical machine 80 serving as a source of a driving force for a hybrid vehicle or an electric vehicle is driven. The rotating electrical machine 80 may drive a 20 compressor of an air conditioner or an oil pump.

In the above, description is given of the exemplary configuration in which switching control is performed so that the timing when the first switching element 5 transitions between the off state and the on state does not coincide with the timing when the second switching element 7 transitions between the off state and the on state. However, the present disclosure is not limited to this configuration. There may be employed a configuration in which switching control is performed at least so that the turn-on timing when the first switching element 5 transitions from the off state to the on state does not coincide with the turn-on timing when the second switching element 7 transitions from the off state to the on state.

In the above, description is given of the exemplary configuration in which, in the small-current range, only the second switching element 7 is subjected to switching control by transferring the second switching control signal S2 via the second control signal line L2, and in the large-current range, both of the first switching element 5 and the second switching element 7 are subjected to switching control by transferring the first switching control signal S1 via the first control signal line L1 and the second switching control signal S2 via the second control signal line L2. However, the present disclosure does not exclude a configuration in which both of the first switching element 5 and the second switching element 7 are subjected to switching control also in the small-current range.

The embodiment disclosed herein is only illustrative in all respects. Thus, various modifications may be made as appropriate without departing from the spirit of the disclosure.

SUMMARY OF EMBODIMENT

A summary of the power conversion device (1) described above is briefly described below.

As one aspect, the power conversion device (1) that converts electric power between DC power and AC power of a plurality of phases includes:

an inverter circuit (10) in which arms (9) are connected in parallel to each other between a DC positive terminal (P) and a DC negative terminal (N) in accordance with the number of phases of alternating currents of the plurality of phases, the arms (9) for respective phases each including two switch sections (2) that are connected in series and to be brought into conduction in an on state and out of conduction in an off state, and a connection point between the two switch sections (2) of each of the arms (9) is set as an AC input or output point of each phase; and a drive control section (20) that outputs switching control signals (S1, S2) for performing switching control on the switch sections (2).

Each of the switch sections (2) is a parallel circuit of a first switching element (5) and a second switching element (7) that is shorter in a transition time between the off state and the on state than the first switching element (5).

In each of the switch sections (2), a first control signal line (L1) connecting a control terminal of the first switching element (5) to the drive control section (20) and a second control signal line (L2) connecting a control terminal of the second switching element (7) to the drive control section (20) are provided independently of each other.

The drive control section (20) independently outputs a first switching control signal (S1) to be output to the first control signal line (L1), and a second switching control signal (S2) that is a signal different from the first switching control signal (S1) and to be output to the second control signal line (L2).

The first switching control signal (S1) and the second switching control signal (S2) are signals for switching, when the first switching element (5) and the second switching element (7) are turned on from the off state to the on state, the first switching element (5) and the second switching element (7) so that a timing when the first switching element (5) is turned on is different from a timing when the second switching element (7) is turned on.

According to this configuration, switching control can individually be performed on the first switching element (5) and the second switching element (7) that have different electric characteristics. That is, the drive control section (20) can finely control the switching timings of both of the switching elements (5, 7) in accordance with the electric characteristics of the elements. For example, the timings of generation of surges in the switching elements (3) at the time of turn-on operation are distributed. This allows suppressing the occurrence of a case where the surges of both of the switching elements (3) are superimposed into a higher surge. Further, a voltage across input and output terminals (for example, across a drain and a source or across a collector and an emitter) can be reduced when one of the switching elements (3) to be brought into the on state with a delay is turned on. Therefore, it is possible to reduce the magnitude of a transient current or a surge to be generated when the switching element (3) is turned on. Thus, it is possible to improve the efficiency of the entire system including various circuit components provided together with the inverter circuit (10) and a target to which AC power is supplied by the inverter circuit (10). That is, it is possible to further increase the efficiency of the entire system by using the power conversion device (1) structured by combining the plurality of types of switching element (3) having different electric characteristics.

It is preferable that an operating range in which an instantaneous value of the alternating current of each phase of the inverter circuit (10) is lower than a predefined small-current reference value be set as a small-current range, that an operating range in which the instantaneous value of the alternating current of each phase is equal to or higher than the small-current reference value be set as a large-current range, and that, at least in the large-current range, both of the first switching element (5) and the second switching element (7) be subjected to switching control by the first switching control signal (S1) and the second switching control signal (S2). Both of the "instantaneous value of the alternating current" and the "small-current reference value" are absolute values.

In the large-current range, a large current can be caused to flow appropriately by using both of the switching elements that are the first switching element (5) and the second switching element (7) connected in parallel. At this time, the turn-off timings of the first switching element (5) and the second switching element (7) are controlled appropriately, whereby the efficiency of the entire system can be increased.

It is preferable that, in the small-current range, only the second switching element (7) be subjected to switching control by the second switching control signal (S2).

In the switch section (2), the two switching elements (3 (5, 7)) are connected in parallel, and therefore the alternating current of each phase flows separately through the two switching elements (3). Thus, a current larger than an allowable value of a single switching element (3) can be caused to flow through the switch section (2). When the instantaneous value of the alternating current is low, the current can be caused to flow through one switching element (3) alone. In the switch section (2), the switching elements (3) having different characteristics are connected in parallel, and therefore the loss of the switch section (2) can be reduced by using, for example, only the second switching element (7) that is relatively shorter in the transition time between the off state and the on state. The control terminal of the first switching element (5) and the control terminal of the second switching element (7) are electrically connected to the drive control section (20) by the different control signal lines (L1, L2) that are independent of each other. The drive control section (20) independently outputs the first switching control signal (S1) and the second switching control signal (S2) different from the first switching control signal (S1). Thus, in the small-current range, the second switching element (7) can appropriately be caused to perform the switching operation while the first switching element (5) is fixed to the off state. As described above, according to this configuration, it is possible to perform a more appropriate switching operation in consideration of the entire system including various circuit components provided together with the inverter circuit (10) and a target to which AC power is supplied by the inverter circuit (10). Thus, it is possible to further increase the efficiency of the entire system by using the power conversion device (1) structured by combining the plurality of types of switching element (3) having different electric characteristics.

It is preferable that the first switching control signal (S1) and the second switching control signal (S2) be signals for further switching, when the first switching element (5) and the second switching element (7) are turned off from the on state to the off state, the first switching element (5) and the second switching element (7) so that a timing when the first switching element (5) is turned off is different from a timing when the second switching element (7) is turned off.

That is, in the power conversion device (1), switching control is performed so that the timing when the first switching element (5) transitions between the off state and the on state does not coincide with the timing when the second switching element (7) transitions between the off state and the on state. According to this configuration, for example, the timings of generation of surges in the switching elements (3) at the time of switching are distributed. This allows reducing the occurrence of a case where the surges of both of the switching elements (3) are superimposed into a higher surge. According to this configuration, the voltage across the input and output terminals (for example, across the drain and the source or across the collector and the emitter) can be reduced when one of the switching elements (3) to be brought into the on state from the off state with a delay is switched. Thus, it is possible to reduce the magnitude of the transient current or the surge to be generated when the switching element (3) is switched.

It is preferable that, when the first switching element (5) and the second switching element (7) are subjected to switching control at different timings, in a first large-current range in which the instantaneous value of the alternating current of each phase (Iu, Iv, Iw) is equal to or higher than the small-current reference value (|I1|) and lower than a large-current reference value (|IL2|) that is higher than the small-current reference value (|I1|), the first switching element (5) be caused to transition to the on state after the second switching element (7) is caused to transition to the on state, and the second switching element (7) be caused to transition to the off state after the first switching element (5) is caused to transition to the off state, and in a second large-current range in which the instantaneous value of the alternating current of each phase (Iu, Iv, Iw) is equal to or higher than the large-current reference value (|I2|), the second switching element (7) be caused to transition to the on state after the first switching element (5) is caused to transition to the on state, and the first switching element (5) be caused to transition to the off state after the second switching element (7) is caused to transition to the off state.

When the first switching element (5) is caused to transition to the on state after the second switching element (7) is caused to transition to the on state, and when the second switching element (7) is caused to transition to the off state after the first switching element (5) is caused to transition to the off state, the switching loss of the first switching element (5) can be reduced. That is, the voltage across the input and output terminals (for example, across the drain and the source or across the collector and the emitter) when the first switching element (5) is switched can be reduced as compared to the voltage across the input and output terminals when the second switching element (7) is switched. The loss of the first switching element (5) at the time of switching is larger than that of the second switching element (7), and therefore the loss of the switch section (2) can be reduced by reducing the switching loss of the first switching element (5).

In the second large-current range, the instantaneous value of the alternating current is higher than that of the first large-current range. The second switching element (7) is an element that is shorter in the transition time between the off state and the on state than the first switching element (5). When the second switching element (7) is such an element, a surge voltage is higher than that of the first switching element (5). Thus, when the second switching element (7) first transitions to the on state in the second large-current range in which the instantaneous value of the alternating current is higher than that of the first large-current range, a surge voltage higher than an allowable value may be applied to the switching element (3). In the second large-current range, the first switching element (5) that is relatively low in the surge voltage is solely brought into the on state first, and the second switching element (7) that is relatively high in the surge voltage is turned on in a state in which the voltage across the input and output terminals (for example, across the drain and the source or across the collector and the emitter) is low. That is, it is possible to reduce the magnitude of the surge voltage to be generated along with the switching of the second switching element (7) that is relatively high in the surge voltage.

As one aspect, it is preferable that the switching control signals have frequencies that are independent among the phases of the alternating currents of the plurality of phases, and that the frequencies of the switching control signals of each phase be higher in the small-current range than the large-current range.

As the frequencies of the switching control signals (S1, S2) are higher, the waveform of the generated alternating current is closer to a sinusoidal wave, whereby pulsation and distortion of the waveform are reduced. Thus, it is preferable that the frequencies of the switching control signals (S1, S2) be as high as possible. When the frequency increases, the switching loss tends to increase as a matter of course. The switching loss decreases as the current flowing through the switching element (3) is smaller. Thus, it is preferable that the frequencies of the switching control signals (S1, S2) of the three phases be higher in the small-current range than the large-current range. The instantaneous value of each of the alternating currents of the three phases (Iu, Iv, Iw) differs depending on a phase angle (θ). Pulse patterns of the switching control signals of the respective phases are selected based on the instantaneous values of the alternating currents. Therefore, the pulse patterns of the three phases differ depending on the phase angle (θ), and are independent of each other. Thus, it is preferable that the switching control signals (S1, S2) have frequencies that are independent among the phases of the alternating currents of the plurality of phases.

As one aspect, it is preferable that the first switching element (5) be a Si-IGBT or a Si-MOSFET, and that the second switching element (7) be a SiC-MOSFET, a GaN-MOSFET, or a SiC-IGBT.

Semiconductor materials such as silicon carbide (SiC) and gallium nitride (GaN) have a wider band gap than silicon (Si), and are referred to as wide band gap semiconductors. Thus, those semiconductor materials have a higher performance than silicon. For example, an IGBT (SiC-IGBT) and a MOSFET (SiC-MOSFET) using SiC as a material are capable of performing higher-speed switching than an IGBT (Si-IGBT) using Si as a material. Therefore, those elements can be used at higher switching frequencies. However, the elements using SiC or GaN as a substrate are currently more expensive than those using Si because of their short history of practical use. In general, a maximum transient current that is allowable in the switching element tends to be larger in, for example, the Si element than the SiC element. For example, the allowable transient current is larger in the Si-IGBT than the SiC-MOSFET. As described above, both of the switching element using Si as a substrate and the switching element using SiC as a substrate have advantages and disadvantages. According to this configuration, it is possible to attain an optimum inverter circuit (10) and an optimum power conversion device (1) including the inverter circuit (10) by taking advantage of the strengths of both switching elements.

As one aspect, it is preferable that the power conversion device (1) be provided between an AC rotating electrical machine (80) and a DC power supply (11), and that the frequencies of the switching control signals (S1, S2) be set in accordance with at least one of a speed of the rotating electrical machine (80), a torque of the rotating electrical machine (80), and a modulation rate from a direct current to an alternating current. As described above, as the frequencies of the switching control signals (S1, S2) are higher, the waveform of the generated alternating current is closer to a sinusoidal wave, whereby pulsation and distortion of the waveform are reduced. Allowable ranges of pulsation and distortion differ depending on the forms and conditions of use of the power conversion device (1). Thus, it is preferable that the frequencies of the switching control signals (S1, S2) be set in accordance with the speed and the torque of the rotating electrical machine (80) to be driven via the power conversion device (1), the modulation rate between the direct current and the alternating current, and the like.

The invention claimed is:

1. A power conversion device that converts electric power between DC power and AC power of a plurality of phases, the power conversion device comprising:
    an inverter circuit in which arms are connected in parallel to each other between a DC positive terminal and a DC negative terminal in accordance with a number of phases of alternating currents of the plurality of phases, the arms for respective phases each including two switch sections that are connected in series and to be brought into conduction in an on state and out of conduction in an off state, and a connection point between the two switch sections of each of the arms is set as an AC input or output point of each phase; and
    a controller that outputs switching control signals for performing switching control on the switch sections, wherein
        each of the switch sections is a parallel circuit of a first switching element and a second switching element that is shorter in a transition time between the off state and the on state than the first switching element,
        in each of the switch sections, a first control signal line connecting a control terminal of the first switching element to the controller and a second control signal line connecting a control terminal of the second switching element to the controller are provided independently of each other,
        the controller independently outputs a first switching control signal to be output to the first control signal line, and a second switching control signal that is a signal different from the first switching control signal and to be output to the second control signal line,
    the first switching control signal and the second switching control signal are signals for switching, when the first switching element and the second switching element are turned on from the off state to the on state, the first switching element and the second switching element so that a timing when the first switching element is turned on is different from a timing when the second switching element is turned on,
    an operating range in which an instantaneous value of the alternating current of each phase of the inverter circuit is lower than a predefined small-current reference value is set as a small-current range,
    an operating range in which the instantaneous value of the alternating current of each phase is equal to or higher than the small-current reference value is set as a large-current range, and
    at least in the large-current range, both of the first switching element and the second switching element are subjected to switching control by the first switching control signal and the second switching control signal.

2. The power conversion device according to claim 1, wherein, in the small-current range, only the second switching element is subjected to switching control by the second switching control signal.

3. The power conversion device according to claim 2, wherein
    the first switching control signal and the second switching control signal are signals for further switching, when the first switching element and the second switching element are turned off from the on state to the off state, the first switching element and the second switching element so that a timing when the first switching element is turned off is different from a timing when the second switching element is turned off, in a first large-current range in which the instantaneous value of the alternating current of each phase is equal to or higher than the small-current reference value and lower than a large-current reference value that is higher than the small-current reference value, the first switching element is caused to transition to the on state after the second switching element is caused to transition to the on state, and the second switching element is caused to transition to the off state after the first switching element is caused to transition to the off state, and in a second large-current range in which the instantaneous value of the alternating current of each phase is equal to or higher than the large-current reference value, the second switching element is caused to transition to the on state after the first switching element is caused to transition to the on state, and the first switching element is caused to transition to the off state after the second switching element is caused to transition to the off state.

4. The power conversion device according to claim 2, wherein the first switching control signal and the second switching control signal have frequencies that are independent among the phases of the alternating currents of the plurality of phases, and the frequencies of the first switching control signal and the second switching control signal of each phase are higher in the small-current range than the large-current range.

5. The power conversion device according to claim 2, wherein the first switching element is a Si-IGBT or a Si-MOSFET, and the second switching element is a SiC-MOSFET, a GaN-MOSFET, or a SiC-IGBT.

6. The power conversion device according to claim 2, wherein
the power conversion device is provided between an AC rotating electrical machine and a DC power supply, and
frequencies of the first switching control signal and the second switching control signal are set in accordance with at least one of a speed of the rotating electrical machine, a torque of the rotating electrical machine, and a modulation rate from a direct current to an alternating current.

7. The power conversion device according to claim 2, wherein the first switching control signal and the second switching control signal are signals for further switching, when the first switching element and the second switching element are turned off from the on state to the off state, the first switching element and the second switching element so that a timing when the first switching element is turned off is different from a timing when the second switching element is turned off.

8. The power conversion device according to claim 7, wherein the first switching element is a Si-IGBT or a Si-MOSFET, and the second switching element is a SiC-MOSFET, a GaN-MOSFET, or a SiC-IGBT.

9. The power conversion device according to claim 8, wherein
the power conversion device is provided between an AC rotating electrical machine and a DC power supply, and
frequencies of the first switching control signal and the second switching control signal are set in accordance with at least one of a speed of the rotating electrical machine, a torque of the rotating electrical machine, and a modulation rate from a direct current to an alternating current.

10. The power conversion device according to claim 7, wherein
the power conversion device is provided between an AC rotating electrical machine and a DC power supply, and
frequencies of the first switching control signal and the second switching control signal are set in accordance with at least one of a speed of the rotating electrical machine, a torque of the rotating electrical machine, and a modulation rate from a direct current to an alternating current.

11. The power conversion device according to claim 1, wherein the first switching control signal and the second switching control signal are signals for further switching, when the first switching element and the second switching element are turned off from the on state to the off state, the first switching element and the second switching element so that a timing when the first switching element is turned off is different from a timing when the second switching element is turned off.

12. The power conversion device according to claim 11, wherein the first switching element is a Si-IGBT or a Si-MOSFET, and the second switching element is a SiC-MOSFET, a GaN-MOSFET, or a SiC-IGBT.

13. The power conversion device according to claim 1, wherein the first switching element is a Si-IGBT or a Si-MOSFET, and the second switching element is a SiC-MOSFET, a GaN-MOSFET, or a SiC-IGBT.

14. The power conversion device according to claim 1, wherein
the power conversion device is provided between an AC rotating electrical machine and a DC power supply, and
frequencies of the first switching control signal and the second switching control signal are set in accordance with at least one of a speed of the rotating electrical machine, a torque of the rotating electrical machine, and a modulation rate from a direct current to an alternating current.

15. The power conversion device according to claim 1, wherein
the first switching control signal and the second switching control signal are signals for further switching, when the first switching element and the second switching element are turned off from the on state to the off state, the first switching element and the second switching element so that a timing when the first switching element is turned off is different from a timing when the second switching element is turned off, in a first large-current range in which the instantaneous value of the alternating current of each phase is equal to or higher than the small-current reference value and lower than a large-current reference value that is higher than the small-current reference value, the first switching element is caused to transition to the on state after the second switching element is caused to transition to the on state, and the second switching element is caused to transition to the off state after the first switching element is caused to transition to the off state, and in a second large-current range in which the instantaneous value of the alternating current of each phase is equal to or higher than the large-current reference value, the second switching element is caused to transition to the on state after the first switching element is caused to transition to the on state, and the first switching element is caused to transition to the off state after the second switching element is caused to transition to the off state.

16. The power conversion device according to claim 1, wherein the first switching control signal and the second switching control signal have frequencies that are independent among the phases of the alternating currents of the plurality of phases, and the frequencies of the first switching control signal and the second switching control signal of each phase are higher in the small-current range than the large-current range.

* * * * *